O. C. Burdict.
Nut Machine.
N° 68,556.    Patented Sept. 3, 1867.

Witnesses.
John H. Shumway
A. J. Tibbitts

Inventor.
O. C. Burdict

O. C. Burdict.
Nut Machine.
Nº 68,556.  Patented Sept. 3, 1867.

Witnesses:
John H. Shumway
Altsie J. Tibbits

Inventor:
O. C. Burdict
by his atty
John E. Earl

United States Patent Office.

O. C. BURDICT, OF NEW HAVEN, CONNECTICUT.

*Letters Patent No. 68,556, dated September 3, 1867.*

---

IMPROVEMENT IN NUT MACHINES.

---

The Schedule referred to in these Letters Patent and making part of the same.

---

TO ALL WHOM IT MAY CONCERN:

Be it known that I, O. C. BURDICT, of New Haven, in the county of New Haven, and State of Connecticut, have invented a new Improvement in Nut Machines; and I do hereby declare the following, when taken in connection with the accompanying drawings, and the letters of reference marked thereon, to be a full, clear, and exact description of the same, and which said drawings constitute part of this specification, and represent in—

Figure 1:
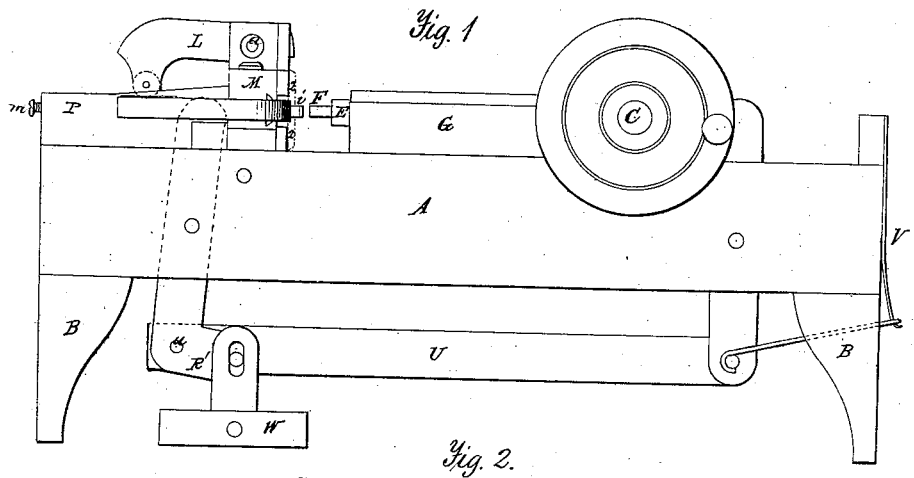
Figure 2:
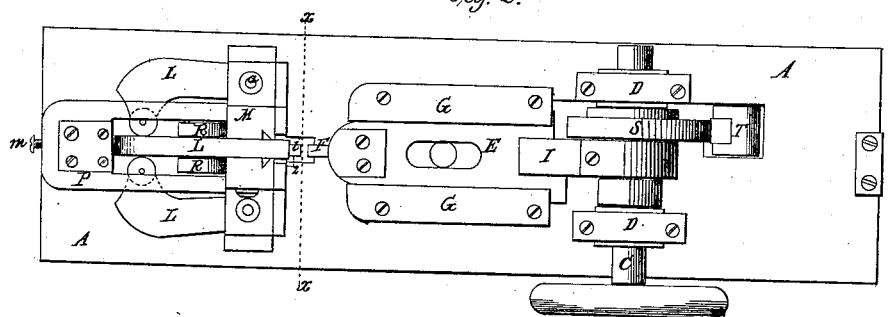
Figure 3:
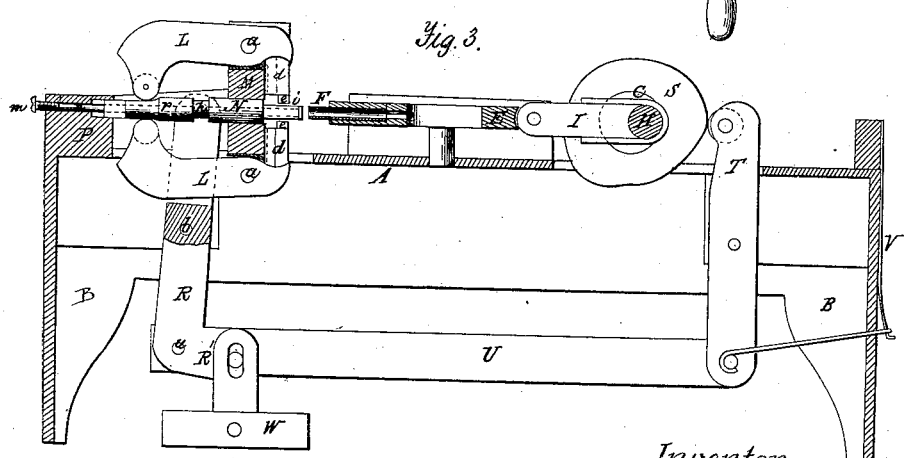
Figure 4:
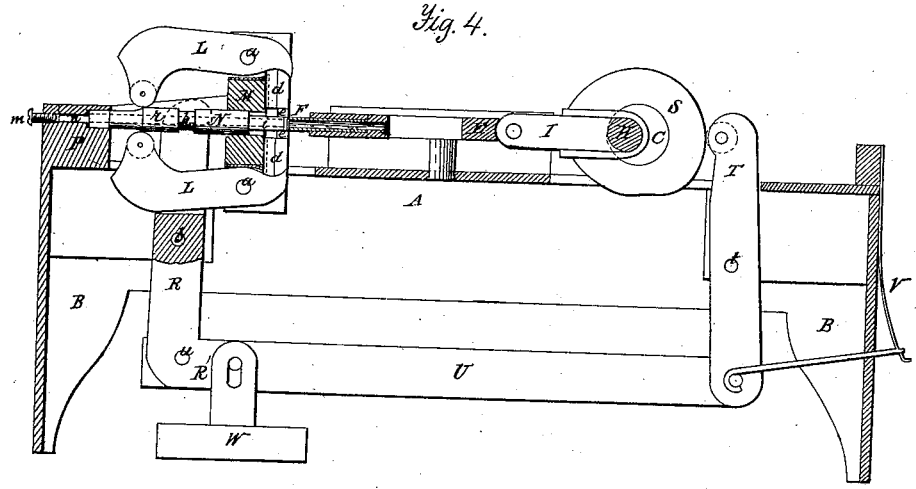

Figure 1, a side view.
Figure 2, a top view.
Figure 3, a longitudinal central section.
Figure 4, a like section, the parts in different position for the purpose of operating the machine; and in
Figure 5 a section on line x x, looking towards the dies.

My invention relates to an improvement in machines for making forged metal nuts for bolts and like purposes, and consists in the peculiar arrangement of the die, combined with the operative parts of the machine, whereby the edges of the nut are pressed smooth, having the appearance of hammered nuts, and in a self-adjusting arrangement, whereby the nut is perfectly formed, and without injury to the machine if the quantity of metal be more or less in successive blanks.

To enable others skilled in the art to construct and use my improvement, I will proceed to describe the same as illustrated in the accompanying drawings.

Figure 5:
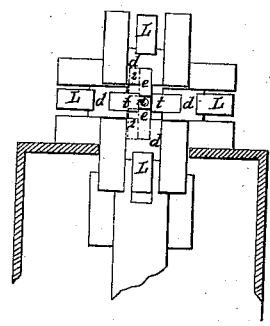

A is the bed of the machine, supported upon legs B, or otherwise, and upon which is placed the operative mechanism of my machine. C, the driving-shaft, is supported so as to revolve freely in bearings D, and driven by power applied thereto in any convenient or well-known manner. E is a slide, carrying a punch, F, (of the size required for the nut to be produced,) and moving freely in slides G, by the action of an eccentric, H, on the driving-shaft, connected to the said slide by a rod, I, or otherwise, so that as the driving-shaft revolves, the slide with its punch is moved, as from the position in fig. 3 to that in fig. 4, and returned. L L L L are levers, corresponding to the number of sides to the nut, hung in a head, M, upon pivots $a$, so that the shorter arm of the levers operates upon slides $d$, each of the said slides carrying one side $e$ or $f$ of the die, and operating so that as the levers L are moved in the manner hereafter described, as from the position in fig. 3 to that in fig. 4, the sides of the die $e$ and $f$ are closed together, as seen in figs. 4 and 5, together forming the die in which the nut is formed. $i$ is the crowner or bottom of the die, its end concave, so as to give to the upper face of the nut the proper convex or crowned form. The said crowner $i$ is attached to or made a part of a mandrel, N, (see figs. 3 and 4,) which moves freely back and forth in the head M, its rear end supported in the tail-block P. The said mandrel N is operated by a lever, R, pivoted at $b$, and forked as seen in fig. 2, so that one leg of the fork lies upon either side of the mandrel N, and upon the said fork projections are formed to set into an annular groove, $h$, on the said mandrel, as denoted by broken lines, fig. 3. The said lever R is actuated by the cam S, through a lever, T, hung at $t$, (see figs. 3 and 4,) connected to the lever R by a rod, U, attached at $u$, so that when the said cam S is in the position as seen in fig. 3, the mandrel, with its crowner, is forced forward, but when the cam has been revolved, as to the position in fig. 4, the reaction of a spring, V, attached to the lever T, as seen in figs. 3 and 4, or an equivalent therefor, forces the mandrel and crowner back to the position seen in fig. 4, which is to the full depth required for the nut. The mandrel is formed with an enlargement or inclined surface, $r$, and the longer arm of the levers is brought down so as to bear upon the mandrel, as seen in figs. 3 and 4, so that when standing in the position seen in fig. 3, the said longer arm rests upon the smaller portion of the mandrel, but when the mandrel is forced back, as before described, the longer arm of the levers is forced up by the enlargement of the mandrel, depressing the sides $e$ and $f$ closely together.

The object of this arrangement will be more fully understood by the operation of the machine, which is as follows: When in the position, as in fig. 3, place the heated bar of metal between the crowner $i$ and the punch F, then, when the driving-shaft is revolved, as from the position in fig. 3 to that in fig. 4, the punch F advances, holding the metal firmly against the crowner, forces the crowner, with the metal, into the die, cutting off the piece required for the nut, by being forced against one of the sides $f$, and when within the die, by the continued movement of the punch, the blank, and the mandrel, the levers L, operated by the enlargement of the mandrel, force the sides of the die together, as seen in fig. 4, and press the several sides perfectly smooth.

Through the mandrel and crowner passes a punch, n, held in the tail-piece P, and adjusted by a set-screw, m, so that as the mandrel, the blank, and the punch F advance into the die, the punch n forces the central portion of the nut into the punch F, which is made hollow to receive it. The punch n, and the corresponding hole in the punch F, being of the size required for the piercing of the nut, the piercings passing through the punch F, each succeeding piercing pressing the previous piercings forward until they fall out at the rear, or they may be otherwise removed from the punch F, the said punch n being central in the crowner; and the sides of the die being properly adjusted, insures a positive central perforation of the nut. On the return of the shaft from the position in fig. 4 to that in fig. 3, the mandrel N advances, releasing the sides of the die, so that the nut is freely moved therefrom, and the punch n being fixed, the mandrel or crowner carries the nut freely and entirely from the die, when another nut may be formed as before.

One great advantage of this arrangement over a fixed die, (that is, over a die formed of the exact size of the nut or blank required,) is, that in such fixed dies the nut is moved within the die after it is formed, and this movement gives to the edges of the nut a scratched and unfinished appearance; and in order to make the edges sufficiently smooth, it is necessary that they be hammered after they come from the machine, whereas in my machine the sides of the die are pressed on to the blank to smooth the edges, and then released, so that the nut passes freely out, having the appearance of hammered edges. Another advantage is that the four sides e and f are more easily repaired and adjusted, whenever their edges or faces are worn, than solid dies.

As it is impossible to always be sure of the same quantity of metal in each blank formed, a great difficulty arises in the manufacture of such blanks, for if too little metal, then the nut will not be fully formed, and if too much, the machine is proportionately strained. To overcome this difficulty I form an arm, R', upon the lever R, as seen in fig. 4, and upon that arm suspend a weight, W, which said weight rests upon the floor, or at some fixed point beneath the machine, so that when the crowner is forced back, the weight will be taken up by the lever R, as seen in fig. 4. Therefore the pressure upon the nut will be governed by the weight W. Whether too little or too much metal is forced into the die, a perfect nut or blank will be formed; and if perchance, as is sometimes done, the finished blank clings to the crowner, so as to be returned into the die with the second blank, then the weight W will be raised still more, and in such case prevent the breakage of the machine.

The advantages of this self-adjustment are too apparent to those acquainted with the use of such machines to require specification here.

I have shown and described the levers L, as operated from the mandrel. This is very simple, and I believe practically the best manner of operation; yet, if preferred, they may be arranged to be operated directly from a separate cam upon the driving-shaft, as will be readily seen by those "skilled in the art."

I have also shown and described the levers as independent of the sides of the die, and each side fixed to a movable slide, and this construction I prefer; yet the side of the die may be fixed directly to or form a part of the lever, which arrangement would dispense with the use of the slides.

As has been before remarked, the width of the bar of metal from which nuts are formed is variable, often being too wide for the dies, which occasions some difficulty in the manufacture of nuts. To overcome this difficulty I reduce the iron, before it is presented to the die, to the proper width by means of swaging-dies 2 2, (see figs. 1, 2, and 5,) denoted in blue. The said dies being placed upon the slides d, and operated by the same levers L, press the iron to the proper width before it is presented to the forming dies, and it is done at the same time that the nut is pressed; that is to say, that part of the bar which is to form the second nut is being swaged while the first nut is being pressed.

Having therefore thus fully described my invention, what I claim as new and useful, and desire to secure by Letters Patent, is—

1. The levers L, arranged so as to operate the several sides of the die, in combination with the crowner i and the punch F, all arranged to operate substantially in the manner described.

2. The combination of the weight W with the crowner i, arranged so as to make the said crowner self-adjusting, substantially in the manner described.

3. The auxiliary swaging-dies 2 2, when arranged to operate with the two parts of the die e e, substantially as and for the purpose specified.

O. C. BURDICT.

Witnesses:
    John H. Shumway,
    Altsie J. Tibbits.